April 27, 1926.　　　　　E. R. GURNEY　　　　　1,582,878
VEHICLE CONSTRUCTION
Filed Nov. 4, 1924　　　2 Sheets-Sheet 1

Inventor
ERVING R. GURNEY.
By his Attorneys
Redding, Greeley, O'Shea & Campbell

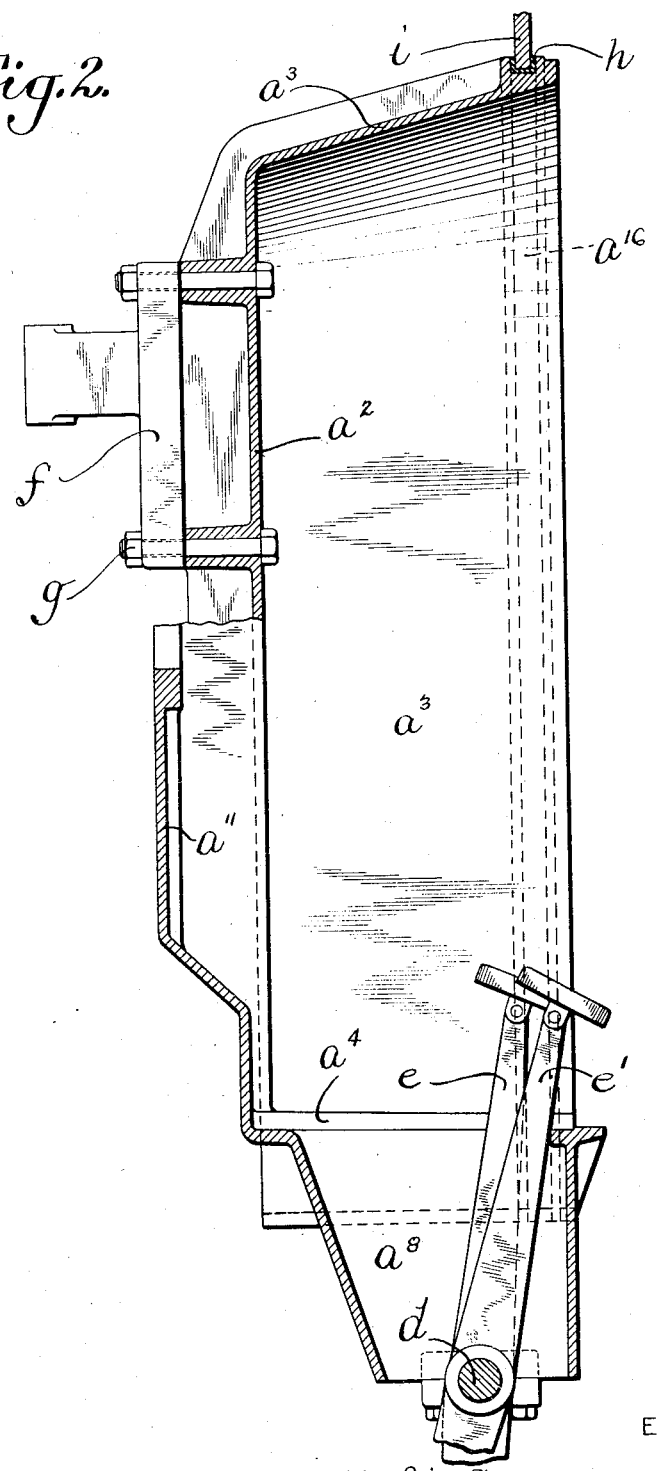

Patented Apr. 27, 1926.

1,582,878

UNITED STATES PATENT OFFICE.

ERVING R. GURNEY, OF BEECHHURST, NEW YORK, ASSIGNOR TO INTERNATIONAL MOTOR COMPANY, OF NEW YORK, N. Y., A CORPORATION OF DELAWARE.

VEHICLE CONSTRUCTION.

Application filed November 4, 1924. Serial No. 747,841.

*To all whom it may concern:*

Be it known that I, ERVING R. GURNEY, a citizen of the United States, residing in Beechhurst, in the borough of Queens, of the city of New York, in the State of New York, have invented certain new and useful Improvements in Vehicle Construction, of which the following is a specification, reference being had to the accompanying drawings, forming a part hereof.

This invention relates to motor vehicles. More particularly the invention relates to an improved dash for motor vehicles which is adapted to be incorporated with the chassis frame. It has heretofore been the practice, in the manufacture of motor vehicles, to construct the vehicle dash as an element of the body whereby the dash and body, as a unitary structure, were placed upon and removed from the chassis frame together. As a support for various operative elements of the vehicle, the dash resembles more nearly the chassis frame in its functions, than the vehicle body. Accordingly, therefore, it is proposed to so construct the dash that it may comprise an element of the chassis frame upon assembly therewith, whereby it may support with the chassis frame, the body as well as other elements of the vehicle. More particularly the dash is formed as a unitary metallic structure and is adapted to be rigidly secured to the chassis frame and to support the forward end of the body. In the interest of compactness of construction and ease of assembly advantage may be taken of the dash, when it is formed as an element of the chassis assembly, to provide a support for control devices for the various actuating mechanisms of the vehicle. To this end the brake and clutch pedals, for instance, may be mounted in the lower part of the dash while the dash may also serve in some situations as one of a series of points of support for the radiator. The dash may also be conveniently formed to receive a yielding connection with the body whereby slight relative movements therebetween are permitted and the squeaks and noises ordinarily resulting from metal to metal contacts are avoided. The invention also resides in the shape and configuration of the dash and its manner of connection with adjacent elements of the vehicle all as more fully apparent from the following description of the accompanying drawings which illustrate a preferred embodiment thereof and in which:

Figure 2 is a view taken in the planes indicated by the broken line 2—2 in Figure 1 and looking in the direction of the arrows and showing the manner of disposing radiator supporting means and control elements such as brake and clutch pedals.

Figure 1:
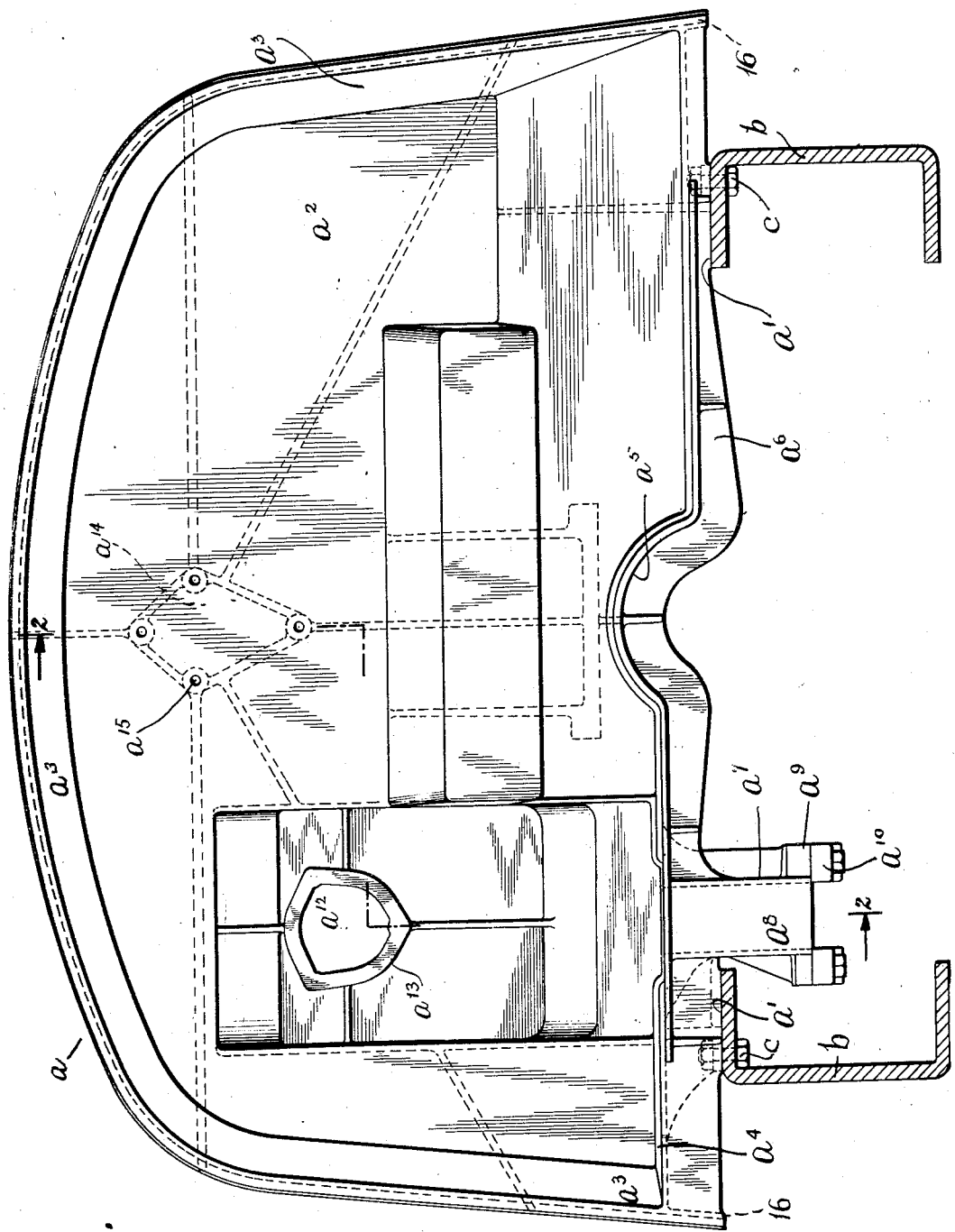
Figure 1 is a view in elevation looking from the rear and showing the dash and the manner of securing the same to the chassis of a motor vehicle.

Referring to Figure 1 the dash indicated as a whole at $a$ is a unitary casting of metal, such as aluminium, and is adapted to be directly supported by the side frame members $b$ of the vehicle chassis, suitable seats $a'$ being formed beneath the dash to rest upon the top flanges of the channels $b$ and be secured thereto as by the bolts $c$. By securing the rigid metallic dash directly to the side frame members in this manner a cross brace for the chassis frame is afforded. The dash is formed with considerable depth in a fore and aft direction and comprises a front face $a^2$ and a hood portion $a^3$ which, beginning at the sides of the dash in the horizontal plane of the seats $a'$ extends upwardly and over the top thereof as indicated clearly in the drawings. A floor portion $a^4$ closes the lower part of the dash. This floor portion is reenforced as by flange $a^6$ and both floor and flange are offset, as at $a^5$, to provide clearance for the propeller shaft. In the floor $a^4$ on the left hand side thereof, when looking forwardly as in Figure 1, there is formed a downwardly projecting portion $a^7$ having a passage $a^8$ therethrough. Flanges $a^9$ thereon are provided with bolt holes $a^{10}$ by which a closure for the passage $a^8$ may be carried therebeneath. Between the closure and the portion $a^7$ is journaled a shaft $d$ upon which are pivoted levers $e, e'$ serving as control means for brake and clutch actuating mechanism, for instance.

In the longitudinal vertical plane of the recess $a^8$ the front face $a^2$ of the dash may be offset in a forward direction as at $a^{11}$ and may be formed with a passage $a^{12}$ for a steering column. If desired seats $a^{13}$ may be formed in the walls of the aperture $a^{12}$ for the reception of a block of rubber serving as a bearing for the steering column.

Forwardly of the front face $a^2$ in substantially the upper central portion thereof there is formed a seat $a^{14}$ having a plurality of bolt holes $a^{15}$ by which a bracket $f$ may be secured by the bolts $g$. This bracket may serve as one point of support for a radiator disposed immediately in front of the dash. It is contemplated in connection with the dash according to the present invention to support the radiator from the chassis upon three points, two points being on the side frame members $b$ and the third point being the bracket $f$, a yielding non-metallic connection (not shown) being provided in each instance.

At a suitable place in the hood $a^3$ there is formed a groove $a^{16}$ running completely around the hood from one lowermost edge thereof to the other. Within this groove is adapted to be disposed yielding non-metallic material $h$, such as rubber, to form a cushioning support for an element $i$ of the body.

It will thus be seen that a vehicle dash is provided which upon assembly forms an element of the chassis frame, is rigidly connected therewith and serves as a transverse strengthening element or brace between the respective side members of the chassis. Suitable control devices may be carried on the dash to be removed from the chassis with the dash in a convenient manner to facilitate access to the interior of the frame for repairs and the like. Being an element of the chassis frame the dash may serve as one point of support for a radiator and may also receive a yielding connection for the body.

Various modifications may be made in the configuration of the dash and in the various control devices etc., mounted thereon as well as in their manner of mounting and no limitation is intended by the foregoing description except as indicated in the appended claims.

What I claim is:

1. In a motor vehicle having separated frame members, a unitary dash, bolts securing the dash rigidly with the frame, means including yielding non-metallic material to support the vehicle body element from the dash, and brake and clutch pedals mounted in the dash.

2. In a motor vehicle, a unitary supporting and brace member shaped to form the dash of the vehicle, means to rigidly secure the same to the vehicle frame, means to mount the control members in said member, means to support the vehicle radiator from a single point at the front of said supporting member and means at the lower portion thereof permitting the transmitting means to pass to the rear of the vehicle.

This specification signed this 1st day of November A. D. 1924.

ERVING R. GURNEY.